April 21, 1970 J. L. AUTERMAN 3,508,149
MEASUREMENT OF REPETITION RATE OF PHASE
VARIATIONS BETWEEN TWO SIGNALS
Filed Oct. 24, 1967 2 Sheets-Sheet 1

INVENTOR
JAMES L. AUTERMAN
Robert F. Potella
AGENT
D. Hodges
ATTORNEY
BY

United States Patent Office 3,508,149
Patented Apr. 21, 1970

3,508,149
MEASUREMENT OF REPETITION RATE OF PHASE VARIATIONS BETWEEN TWO SIGNALS
James L. Auterman, Ann Arbor, Mich., assignor, by mesne assignments, to the United States of America as represented by the Secretary of the Navy
Filed Oct. 24, 1967, Ser. No. 677,792
Int. Cl. G01r 25/00
U.S. Cl. 324—85                                    6 Claims

---

ABSTRACT OF THE DISCLOSURE

Apparatus for measuring predetermined values of phase difference between two signals includes frequency multiplier stages for each of the two signal channels. The channels each control a flip-flop the output of which is a pulse whose width represents the amount of phase difference. The flip-flop output is fed through a low pass filter the output of which is a phase sensitive voltage and then differentiated and fed to a phase inverter having separate positive triggers related to the positive and negative pulses from the differentiator. The triggers are fed to an AND gate and flip-flop combination which prevents erroneous phase differences from being registered. The outputs of the combination are fed through one-shot multivibrators to an integrator and then recorded on a graphic recorder representing the average frequency of occurrence of the predetermined phase difference.

---

SUMMARY

The present invention relates to a phase measuring system and more particularly to a system for recording the frequency of occurrence of phase changes of a specific preset value between two signals.

It is an object of this invention to provide a phase angle measuring system for measuring specific phase increments between a signal and a reference source.

Another object of this invention is to provide a system for recording the frequency of occurrence of specific phase change values between two signals.

BRIEF DESCRIPTION OF DRAWINGS

These and other objects of the invention will become apparent by reference to the following description taken in conjunction with the accompanying drawings, wherein.

DETAILED DESCRIPTION AND OPERATION

Figure 1:
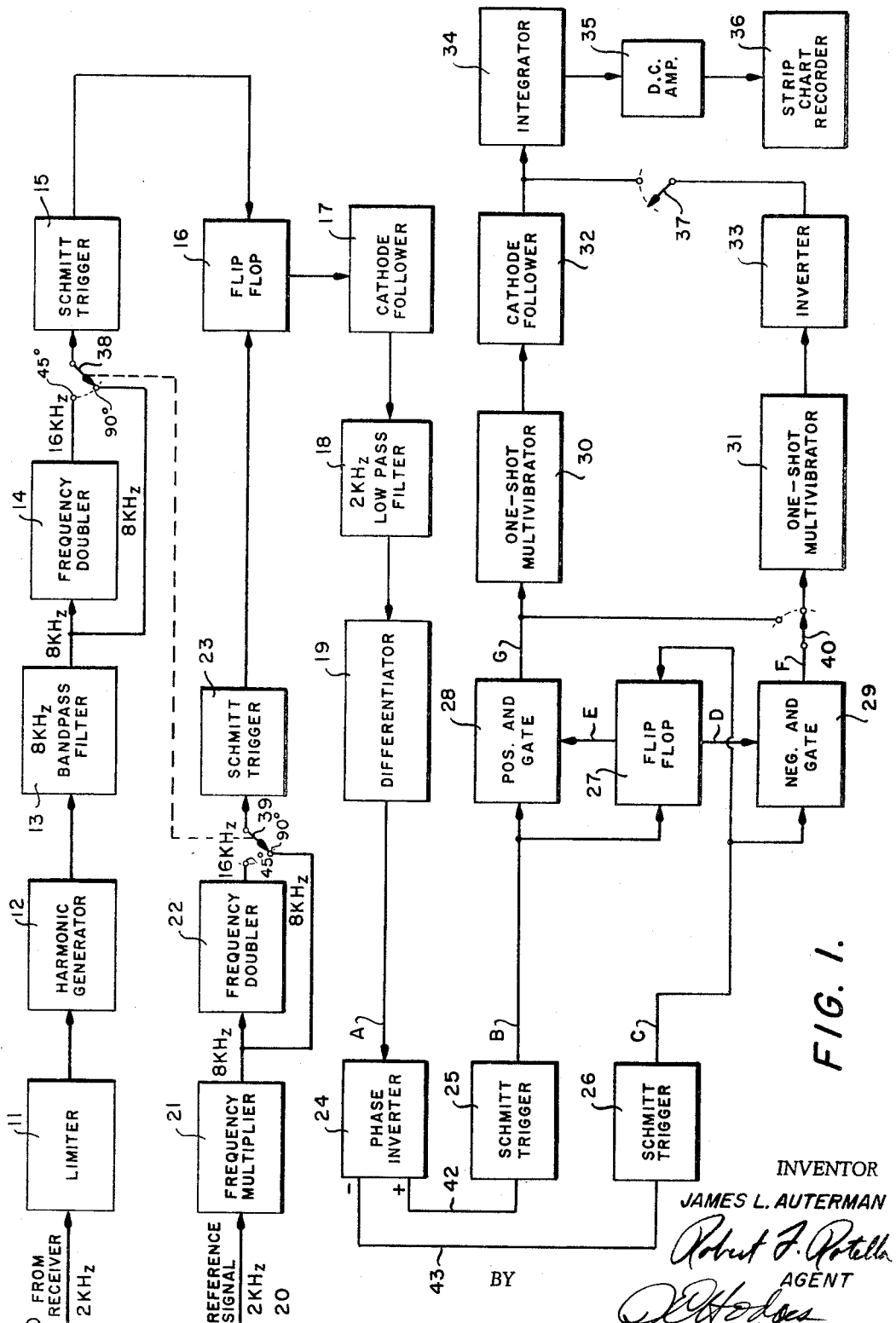
FIG. 1 is a block diagram representation of a system employing the present invention.

Referring to FIG. 1, the phase stability recorder comprising the invention compares the phase relationship between a reference signal, which may be derived from a local oscillator, applied to input terminal 20 and another signal, which may be derived from a receiver and hereafter so designated, applied to input terminal 10. By way of illustration, the two signals are here indicated as tones having a frequency of 2 kHz. At any given time, the phase difference between the reference and receiver signals may be zero. However, as a result of propagation disturbances and delays as well as small frequency differences between the local frequency standards used at the transmitter and receiver installations, the phase relationship between the two signals will change with time. In accordance with the principles of the present invention, when the phase difference between the two signals reaches a pre-set amount, say, 45 or 90 degrees, a pulse is generated, the polarity of which may be made to correspond with the direction of phase change. The value of the average frequency of the pulses is determined and recorded on a graphic recorder.

The receiver signal is fed to the input of a limiter stage 11 which converts the essentially sinusoidal input to a square wave which is fed to a harmonic generator stage 12. The harmonic generator 12 multiplies the frequency of the input wave to yield a number of waves which are integrally related to the input frequency. The output from the harmonic generator 12 is fed into bandpass filter 13 which selects the 8 kHz. harmonic and feeds it to frequency doubler 14 and to one terminal of SPDT switch 38. Switch 38 permits selection of the specific value of phase shift between the receiver and reference signals to which the system will respond. In the present example a phase shift value of either 45 or 90 degrees may be selected. in the 45° position the receiver signal channel is fed through a frequency doubler 14, the output of which is 16 kHz., while in the 90° position, the frequency doubler is bypassed and fed through switch 38 to Schmitt trigger 15. The output of the Schmitt trigger is connected to one input of flip-flop 16.

The reference signal, which may be derived from a stable, crystal-controlled local oscillator, is fed to a frequency multiplier 21 which is designed to multiply the input frequency by a factor of four; thus, the output in the preferred embodiment is 8 kHz. The output of the frequency multiplier is connected to the input of a frequency doubler 22 as well as to one terminal of SPDT switch 39. The output of the frequency doubler, 16 kHz., is connected to the other terminal or switch 39.

Switch 39, which is mechanically ganged with switch 38, permits selection of the specific value of phase shift between the receiver and reference signals to which the system will respond, either 45 or 90 degrees in the preferred embodiment. Switch 39 is connected to the input of Schmitt trigger 23.

The outputs of the two Schmitt triggers 15, 16 are connected to flip-flop stage 16, the output of which is connected to cathode follower 17. The output of cathode follower 17 is fed to a low pass filter 18 having an upper cutoff frequency of 2 kHz. The output of filter 18 is connected to a differentiator network 19 the output of which is connected to the input of a phase inverter 24.

By way of example, phase inverter 24 may comprise two triodes having their cathodes connected in common to a voltage source. The input is applied to the grid of one triode and one output taken from the plate thereof. The plates of both tubes are connected through suitable biasing resistors to the voltage source. The other output is taken from the plate of the other triode the grid of which is grounded.

The output of phase inverter 24 comprises a positive channel 42 and negative channel 43, fed, respectively, to Schmitt triggers 25 and 26. The output of Schmitt trigger 25 is connected to the input of flip-flop 27 and positive AND gate 28. The output of Schmitt trigger 26 is connected to the input of flip-flop 27 and negative AND gate 29. The respective outputs of flip-flop 27 are connected to the gates 28 and 29. The respective output of AND gates 28 and 29 are connected to one-shot multivibrators 30 and 31. The output of multivibrator 31 is connected to inverter 33 the output of which is connected through SPST switch 37 to the input of integrator 34 to which is also connected the output of cathode follower 32 fed from multivibrator 30. The output of integrator 34 is fed through a direct current amplifier 35 to a strip chart recorder 36.

In operation, the 2 kHz. signal derived from the receiver and applied to terminal 10 is fed to limiter stage 11 which converts the input wave to essentially a square wave output which has a content which is small in even harmonics. The fourth harmonic (8 kHz.) is obtained by means of the harmonic generator 12 which is connected to the 8 kHz. bandpass filter 13 which allows that frequency to pass and rejects all others.

The output of filter 13 is connected to Schmitt trigger 15 either directly through switch 38 or through frequency doubler 14. This arrangement permits selection of a specified amount of phase shift between the two signals to which the system will respond, either 45° or 90° in the present preferred embodiment. By passing the output of filter 13 through a frequency doubler stage 14, which converts the 8 kHz. input to a 16 kHz. output, the system will respond to a phase shift of 45° which is equivalent to one-eighth of a cycle of an A-C wave since, when the input signal passes through a change of 45°, a signal of eight times the frequency of the input will pass through the same period in 360°. Consequently, the zero to 360 degree range of the system has been converted to a range of zero to 45 degrees when referred to the 2 kHz. input signal. Thus, the 2 kHz. input from the receiver applied to terminal 10 has been multiplied eight times. Similarly, by bypassing the frequency doubler 14 the system will respond to a phase difference of 90° since that amount equals one-quater of an A-C wave and the 2 kHz. input has been multiplied by a factor of four resulting in 8 kHz. The output of switch 38 is connected through Schmitt trigger 15 to one input of flip-flop 16.

The 2 kHz. reference signal, applied through terminal 20, is fed to a frequency multiplier 21 which multiplies by a factor of four. The 8 kHz. output is connected to Schmitt trigger 23 either directly through switch 39 or through frequency doubler 22. This permits selection of either a 45° or 90° phase shift as heretofore described in connection with the receiver signal. The Schmitt trigger 23 output is connected to another input of flip-flip 16.

The Schmitt triggers 15 and 23 generate trigger signals which force the flip-flop stage 16 to alternate between its stable states resulting in output pulses having pulse widths directly related to the phase difference between the input signals applied to the Schmitt triggers 15 and 23. The flip-flop output is fed through a cathode follower stage 17 which drives the 2 kHz. low pass filter 18 the output of which is a low frequency signal which varies, linearly, in voltage from 0 volts to a small positive voltage as the phase difference between the two signals varies from 0° to 360°; zero volts corresponding to 0° and the maximum positive voltage corresponding to 360°. When the phase difference exceeds 360° the output falls back to zero volts and starts over again. The output of the low pass filter 18 is ambiguous at 0° and 360° resulting in a rapid transition from the maximum positive voltage value to zero or vice versa. For phase differences greater than 360° the output corresponds to the equivalent angle between 0° and 360°. The typical output waveform of filter 18 is shown designated "Phase Detector Output" in FIG. 2. The term phase detector refers here to Schmitt triggers 15 and 23, flip-flop 16, cathode follower 17 and filter 18.

Figure 2:
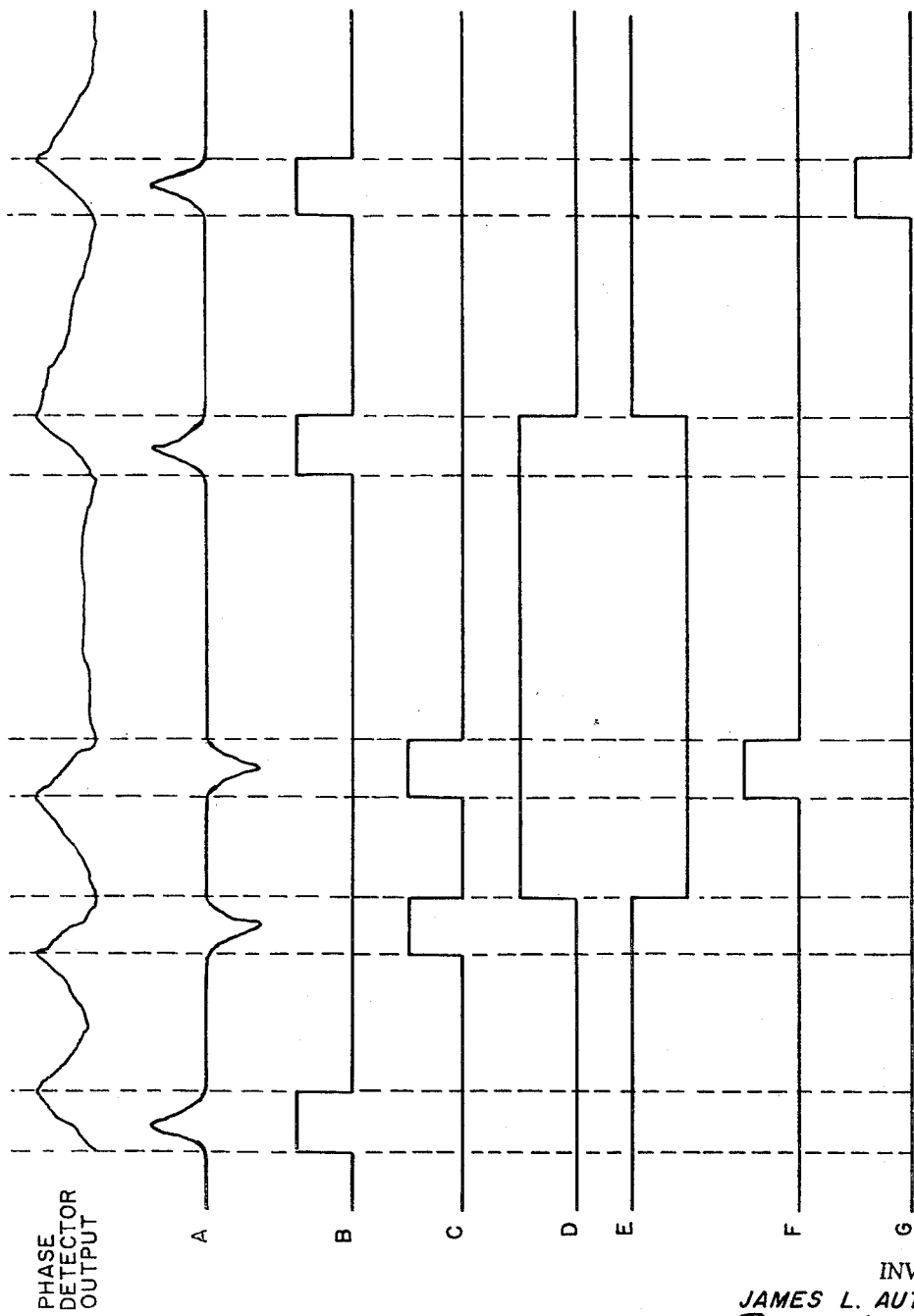
FIG. 2 is a graphical representation of typical waveforms appearing at various points in the system.

Differentiator stage 19 processes the output of filter 18 into an output comprising pulses having a polarity corresponding to the direction of phase change of the output from the phase detector (filter 18) as shown in Graph A of FIG. 2 corresponding to point A, the input to the phase inverter, in FIG. 1. Such a pulse is obtained every time a phase change of 45 or 90 degrees occurs.

The output of differentiator 19 is connected to phase inverter stage 24 which has two outputs connected to Schmitt triggers 25 and 26 through leads 42 and 43, respectively. The phase inverter outputs comprise separate positive-going triggers corresponding to positive and negative pulses from the differentiator 19 output. Thus, lead 42 conducts a positive pulse which is applied to Schmitt trigger 25 in response to a positive-going pulse from the differentiator. Similarly, lead 43 conducts a positive pulse to Schmitt trigger 26 in response to a negative-going pulse from differentiator 19. The output of Schmitt trigger 25, a positively-pulsed wave as shown as Graph B of FIG. 2, is fed to one input of flip-flop 27 as well as to an input of positive AND gate 28. The output of Schmitt trigger 26, shown as Graph C of FIG. 2, is fed to the other input of flip-flop 27 as well as to an input of negative AND gate 29. The two outputs of flip-flop 27 are connected, respectively, to the other inputs of gates 28 and 29.

The arrangement formed by flip-flop 27 and the AND gates 28, 29 resolves the ambiguity which exists when the phase difference is in the vicinity of the 45 or 90 degree transistion levels. This occurs when small perturbations cause the waves to alternate back and forth across the transistor levels generating pulses at the output of the phase inverter. Obviously, such pulses should not be counted since the phase change was not 45 or 90 degrees. Under these conditions the pulses fed to phase inverter 24 will alternate in polarity which information may be used to prevent such pulses from being counted since the one-shot multvibrators 30, 31 will not be triggered unless there are two successive pulses of the same polarity fed out of the Schmitt triggers 25, 26. A pulse from one of the Schmitt triggers 25, 26 will have a trailing edge which will act as a negative trigger and turn off the portion of the flip-flop associated with it if it is not turned off already. The flip-flop thus remembers the polarity of the previous pulse applied to the input of the phase inverter 24.

For example, if the first pulse is positive, Schmitt trigger 25 would produce a trigger which would turn off the portion of the flip-flop to which the positive AND gate 28 is connected and impress a positive bias voltage on the lead connected to gate 28. A second pulse, if positive, will cause Schmitt trigger 25 to generate a positive pulse which is fed to the other input of positive AND gate 28. Since both inputs to gate 28 are positive it will conduct and trigger the one-shot multivibrator 30. On the other hand if the second pulse fed to phase inverter 24 had been negative, Schmitt trigger 26 would have generated a positive pulse which would have been fed to its associated half of flip-flop 27 and negative AND gate 29. The negative AND gate would not have passed this pulse because the input from the flip-flop was not a positive value needed to satisfy the AND condition, the flip-flop having remembered that the first pulse fed into phase inverter 24 was positive. The operation is reversed in the case of the opposite pulse sequence.

As shown in Graphs F and G of FIG. 2 output pulses will appear on the inputs to the one-shot multivibrators 30, 31 (labeled points G and F, respectively, in FIG. 1) only after a succession of two pulses having the same polarity are fed out of the Schmitt triggers 25, 26. Thus, at time $t_5$ to $t_6$ and at time $t_9$ to $t_{10}$ output pulses will appear. Note that the output pulse $t_5$ to $t_6$ appears only when both points C and D are simultaneously positive. The case is similar in the case of the pulse at $t_9$ to $t_{10}$ with respect to points B and E.

The one-shot multivibrators 30 and 31 upon being triggered from the respective AND gates 28 and 29 produce a positive pulse having a predetermined pulse width. The output of multivibrator 30 is fed through a cathode follower to an integrating network 34. This arrangement provides a positive pulsed input to the integrator. The output of multivibrator 31 is fed through an inverter stage 33, the output of which provides negatively pulsed inputs through switch 37 to integrator 34. Inverter 33 may be adjusted so that its negative output can correspond with the amplitudes of the positive outputs from the cathode follower 32. This enables the integrator 34 to have an output which swings both positively and negatively.

Alternatively, switch 40 may be used to connect the output of the negative AND gate 29 to multivibrator 30, thus connecting both AND gates through one multivibrator resulting in a positive output from integrator 34. Switch 37 disconnects inverter 33 in this mode. The integrator output is connected to a direct curent amplifier 34 which drives a graphic strip chart recorder 36 thus recording the average frequency of the pulses corresponding to the incidences that the pre-set phase shift value is reached between the two signals.

Obviously many modifications and variations of the present invention are possible in the light of the above teachings. It is therefore to be understood that the invention may be practiced otherwise than as specifically described.

What is claimed is:

1. A system for measuring occurrence rates of phase differences between two electrical signals comprising:
   phase detector means including first and second Schmitt trigger means each having an input and an output;
   one of said electrical signals being connected to the input of the first Schmitt trigger means through a first channel and the other of said electrical signals being connected to the input of the second Schmitt trigger means through a second channel;
   frequency multiplier means connected in said first and second channels for multiplying, respectively the frequency of said first and second electrical signals;
   said frequencies being multiplied by an integral amount related to the specific phase difference being measured between the two electrical signals;
   phase inverter means having an input, a first output and a second output, said first output being responsive to positively poled input signals and said second output being responsive to negatively poled input signals;
   the output of said phase detector means being connected to the input of said phase inverter means;
   a first flip-flop means having first and second inputs and first and second outputs;
   first and second AND gate means;
   the first output of said phase inverter means being connected to the first input of said first flip-flop means and to said first AND gate means;
   the second output of said phase inverter means being connected to the second input of said first flip-flop means and to said second AND gate means;
   the first and second outputs of said first flip-flop means being connected as inputs respectively, to the first and second AND gate means;
   second flip-flop means having first and second inputs and an output;
   the output of the first Schmitt trigger means being connected to the first input of said second flip-flop means and the output of said second Schmitt trigger means being connected to the second input of said second flip-flop means;
   said second flip-flop output comprising pulses the widths of which are proportional to the phase difference between said two electrical signals;
   low pass filter means connected to the output of said second flip-flop means;
   differentiator means connected between said low pass filter and said phase inverter means;
   integrator means;
   said AND gates being connected to said integrator means; and
   recording means;
   said integrator means being connected to said recording means.

2. A phase measurement system as set forth in claim 1 further including:
   third Schmitt trigger means connected between the first output of said phase inverter means and the first input of said first flip-flop means and fourth Schmitt trigger means connected between the second output of said phase inverter means and the second input of said first flip-flop means.

3. A phase measurement system as set forth in claim 2 further including:
   first multivibrator means connected to the output of said first AND gate means; and
   second multivibrator means connected to the output of said second AND gate means.

4. A phase measurement system as set forth in claim 3 further including:
   cathode follower means connected between said first multivibrator means and said integrator means; and
   inverter means connected between said second multivibrator means and said integrator means.

5. A phase measurement system as set forth in claim 4 further including:
   direct current amplifier means connected between said integrator means and said recording means;
   said recording means comprising a graphic recorder.

6. A phase measurement system as set forth in claim 5 further including:
   limiter means connected in said first channel;
   the electrical signal connected to said second channel being a relatively stable reference signal;
   said two signals having relatively equal frequencies; and
   said frequency multiplier means multiplying the frequencies of said electrical signals by an equal amount inversely proportional to the specific phase difference being measured.

References Cited

UNITED STATES PATENTS

| 2,806,295 | 9/1957 | Ball. | |
| 2,991,416 | 7/1961 | Ramp et al. | 324—79 |
| 3,069,623 | 12/1962 | Murgio | 324—79 X |
| 3,092,736 | 6/1963 | Ernyei | 328—133 X |
| 3,217,326 | 11/1965 | Kaufman et al. | 324—85 X |

ALFRED E. SMITH, Primary Examiner